(12) United States Patent
Zimerman

(10) Patent No.: US 8,681,807 B1
(45) Date of Patent: Mar. 25, 2014

(54) METHOD AND APPARATUS FOR SWITCH PORT MEMORY ALLOCATION

(75) Inventor: Yaron Zimerman, Holon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 800 days.

(21) Appl. No.: 12/118,325

(22) Filed: May 9, 2008

Related U.S. Application Data

(60) Provisional application No. 60/916,955, filed on May 9, 2007, provisional application No. 60/944,254, filed on Jun. 15, 2007.

(51) Int. Cl.
*H04L 12/54* (2013.01)
*G06F 15/173* (2006.01)

(52) U.S. Cl.
USPC .......................................... 370/429; 709/226

(58) Field of Classification Search
None
See application file for complete search history.

(56) References Cited

U.S. PATENT DOCUMENTS

| | | | | |
|---|---|---|---|---|
| 4,082,922 A * | 4/1978 | Chu | | 370/230 |
| 5,541,912 A * | 7/1996 | Choudhury et al. | | 370/412 |
| 5,757,771 A * | 5/1998 | Li et al. | | 370/418 |
| 5,809,078 A * | 9/1998 | Tani et al. | | 375/259 |
| 6,046,817 A * | 4/2000 | Brown et al. | | 358/1.16 |
| 6,084,856 A * | 7/2000 | Simmons et al. | | 370/235 |
| 6,115,387 A * | 9/2000 | Egbert et al. | | 370/423 |
| 6,219,728 B1 * | 4/2001 | Yin | | 370/412 |
| 6,496,516 B1 * | 12/2002 | Dabecki et al. | | 370/460 |
| 6,535,963 B1 * | 3/2003 | Rivers | | 711/149 |
| 6,717,912 B1 * | 4/2004 | Lemyre et al. | | 370/230 |
| 6,724,721 B1 * | 4/2004 | Cheriton | | 370/229 |
| 6,898,203 B2 * | 5/2005 | Belk | | 370/412 |
| 6,975,638 B1 * | 12/2005 | Chen et al. | | 370/412 |
| 7,002,980 B1 * | 2/2006 | Brewer et al. | | 370/414 |
| 7,023,866 B2 * | 4/2006 | Giroux et al. | | 370/412 |
| 7,039,013 B2 * | 5/2006 | Ruutu et al. | | 370/235 |
| 7,110,415 B1 * | 9/2006 | Walsh et al. | | 370/414 |
| 7,120,117 B1 * | 10/2006 | Liu et al. | | 370/236 |
| 7,307,998 B1 * | 12/2007 | Wang et al. | | 370/412 |
| 7,609,636 B1 * | 10/2009 | Mott | | 370/235 |
| 7,630,306 B2 * | 12/2009 | Chuang | | 370/229 |
| 7,707,330 B2 * | 4/2010 | Rao | | 370/412 |
| 2001/0007565 A1 * | 7/2001 | Weng et al. | | 370/429 |
| 2002/0031129 A1 * | 3/2002 | Finn et al. | | 370/395.41 |
| 2002/0075882 A1 * | 6/2002 | Donis et al. | | 370/412 |
| 2002/0141427 A1 * | 10/2002 | McAlpine | | 370/413 |
| 2003/0123392 A1 * | 7/2003 | Ruutu et al. | | 370/235 |
| 2006/0031643 A1 * | 2/2006 | Figueira | | 711/154 |
| 2006/0092837 A1 * | 5/2006 | Kwan et al. | | 370/229 |
| 2007/0025242 A1 | 2/2007 | Tsang | | |
| 2007/0268926 A1 * | 11/2007 | Nakagawa et al. | | 370/428 |
| 2007/0268931 A1 * | 11/2007 | Shaikli | | 370/412 |
| 2008/0126525 A1 * | 5/2008 | Ueoka et al. | | 709/223 |

* cited by examiner

*Primary Examiner* — Timothy J Weidner

(57) ABSTRACT

A packet switching device can allocate memory resources dynamically in order to utilize the memory resources efficiently. The packet switching device can include at least one ingress port that receives incoming packets from a network, a plurality of egress ports that transmit outgoing packets to the network, a storage unit configured to temporarily store the outgoing packets before transmission by the plurality of egress ports, the storage unit being coupled to the plurality of egress ports, so that a portion of the storage unit is dynamically allocated to an egress port, and a controller configured to dynamically allocate the portion of the storage unit to the egress port based on a network status.

29 Claims, 9 Drawing Sheets

| ENTRY NUMBER | PER PORT DESCRIPTOR BUFFER LIMIT | PER PORT DATA BUFFER LIMIT |
|---|---|---|
| 1 | 512 | 1024 |
| 2 | 256 | 512 |
| 3 | 171 | 341 |
| 4 | 128 | 256 |
| 5 | 102 | 205 |
| 6 | 85 | 171 |

502

| NETWORK STATUS | ALLOCATION PROFILE |
| --- | --- |
| STATUS 1 | PROFILE 1 |
| STATUS 2 | PROFILE 2 |
| STATUS 3 | PROFILE 3 |

| ENTRY NUMBER | PER PORT DESCRIPTOR BUFFER LIMIT | PER PORT DATA BUFFER LIMIT |
|---|---|---|
| 1 | 2048 | 4096 |
| 2 | 1024 | 2048 |
| 3 | 683 | 1365 |
| 4 | 512 | 1024 |
| 5 | 410 | 819 |
| 6 | 341 | 683 |
| 7 | 293 | 585 |
| 8 | 256 | 512 |
| 9 | 228 | 455 |
| 10 | 205 | 410 |
| 11 | 186 | 372 |
| 12 | 171 | 341 |
| 13 | 158 | 315 |
| 14 | 146 | 293 |
| 15 | 137 | 273 |
| 16 | 128 | 256 |
| 17 | 120 | 241 |
| 18 | 114 | 228 |
| 19 | 108 | 216 |
| 20 | 102 | 205 |
| 21 | 98 | 195 |
| 22 | 93 | 186 |
| 23 | 89 | 178 |
| 24 | 85 | 171 |

FIG. 5A

METHOD AND APPARATUS FOR SWITCH PORT MEMORY ALLOCATION

INCORPORATION BY REFERENCE

This application claims the benefit of U.S. Provisional Applications No. 60/916,955, "Dynamic Resource Allocation in a Packet Processor" filed on May 9, 2007, and No. 60/944,254, "Dynamic Resource Allocation in a Packet Processor" filed on Jun. 15, 2007, which are incorporated herein by reference in their entirety.

BACKGROUND

A packet switching device may include a plurality of communication ports, such as ingress ports that can receive incoming packets, egress ports that can transmit outgoing packets, and the like. In addition, the packet switching device may include resources, such as memory, CPU, and the like, that can be utilized for processing the received packets. The resources can be allocated to the plurality of communication ports. For example, a descriptor memory block can be allocated to an egress port. The egress port can then utilize the descriptor memory block to buffer control information (descriptor) of an outgoing packet. For another example, a data memory block can be allocated to an egress port. The egress port and then utilize the data memory block to buffer data of an outgoing packet.

In an allocation technique, resources can be allocated to the plurality of communication ports statically. For example, a storage unit having 100 memory blocks can be evenly allocated to four egress ports. Therefore, each egress port can have 25 memory blocks during operation.

SUMMARY

However, the static allocation technique can result in inefficient utilization of resources, e.g., resources allocated to a non-active egress port. The disclosure can provide a resource allocation method that can utilize resources of a packet switching device more efficiently.

Aspects of the disclosure can provide a packet switching device coupled to a network. The packet switching device can include at least one ingress port that receives incoming packets from the network, a plurality of egress ports that transmit outgoing packets to the network, a storage unit configured to temporarily store the outgoing packets before transmission by the plurality of egress ports, the storage unit being coupled to the plurality of egress ports, so that a portion of the storage unit is dynamically allocated to an egress port, and a controller configured to dynamically allocate the portion of the storage unit to the egress port based on a condition, such as a network status, an egress port status, and the like.

In addition, the controller can further include a lookup table that includes the portion of the storage unit corresponding to the condition. Alternatively, the controller may include an algorithm configured to determine the portion of the storage unit based on the condition.

According to an aspect of the disclosure, the network status can include a link status corresponding to a number of egress ports that are actively coupled to the network at a given time.

According to another aspect of the disclosure, the network status can include an activity status corresponding to a flow of packets transmitted by an egress port.

According to another aspect of the disclosure, the network status can include a congestion status corresponding to a state of packet traffic congestion of an egress port. Further, the state of packet traffic congestion of the given egress port can include a state of utilization of the portion of the storage unit allocated to the given egress port.

Additionally, the storage unit can further include descriptor buffers configured to store control information of the outgoing packets, and data buffers configured to store data of the outgoing packets.

Aspects of the disclosure can also provide a packet switching device. The packet switching device can include at least one ingress port configured to receive incoming packets of data, a plurality of egress ports configured to transmit outgoing packets of data, a dynamically configurable storage unit configured to include memory blocks that are allocated to the plurality of egress ports, at least one memory block that can be dynamically allocated to the plurality of egress ports, a processor configured to direct an incoming packet of data from at least one ingress port to one or more of the plurality of egress ports based on information associated with the incoming packet of data, wherein at least a portion of the information is stored in a memory block during processing of the packet of data, and a controller configured to allocate the at least one memory block to an egress port as a function of a condition of at least one egress port.

Aspects of the disclosure can also provide a method for allocating a storage unit in a packet switching device. The method can include detecting a network status of a plurality of egress ports of the packet switching device, allocating a portion of the storage unit to an egress port based on the network status, receiving incoming packets from at least one ingress port, storing at least a portion of an outgoing packet corresponding to at least one incoming packet in the portion of the storage unit allocated to the egress port, and transmitting the outgoing packet.

Additionally, aspects of the disclosure can provide a computer readable medium storing program instructions for causing a controller of a packet switching device to perform memory allocation steps. The memory allocation steps can include detecting a network status of a plurality of egress ports of the packet switching device, allocating a portion of a storage unit to an egress port based on the network status, receiving incoming packets from at least one ingress port, storing at least a portion of an outgoing packet corresponding to at least one incoming packet in the portion of the storage unit allocated to the egress port, and transmitting the outgoing packet.

BRIEF DESCRIPTION OF THE DRAWINGS

Various exemplary embodiments of this disclosure will be described in detail with reference to the following figures, wherein like numerals reference like elements, and wherein:

FIGS. 5A-5B show examples of memory allocation tables;

DETAILED DESCRIPTION OF EMBODIMENTS

Figure 1:
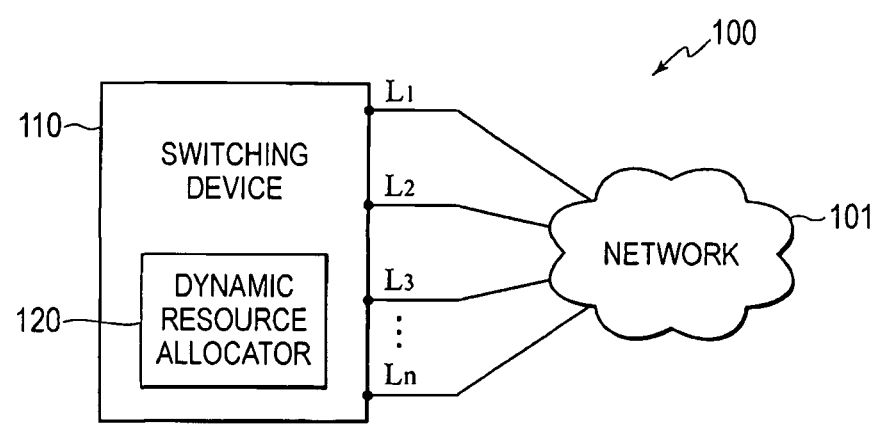
FIG. 1 shows an example of a network system.

FIG. 1 shows an example of a network system utilizing a resource allocation method according to the disclosure. The network system 100 can include a network 101 and a packet switching device 110 coupled by communication links $L_1$ to $L_n$. The network 101 can send a packet to the packet switching device 110 via one of the communication links $L_1$ to $L_n$. The packet switching device 110 can perform packet processing, such as storing, forwarding, and the like, according to the disclosure.

The network 101 can be wired, wireless, a local area network (LAN), a wide area network (WAN), a peer-to-peer network, the Internet, etc., or any combination of these that couples to the packet switching device 110. The communication link $L_1$ to $L_n$ can be any type of wired or wireless link, including, but not limited to, multiple twisted pair cables, DSL, coaxial cable, fiber optics, RF cable modems, over the air frequency, over the air optical wavelength (e.g. infrared), satellite transmission, simple direct serial/parallel wired connections, or the like, or any combinations of these.

The packet switching device 110 can include communication ports, such as ingress ports that can receive packets from the communication links $L_1$ to $L_n$, egress ports that can transmit packets to the communication links $L_1$ to $L_n$, and the like. In addition, the packet switching device 110 can include resources, such as storage unit, computing unit, and the like, that can process the packets. According to the disclosure, the resources can be dynamically allocated to the communication ports based on a network status, for example, by means of a dynamic resource allocator 120.

Figure 2:
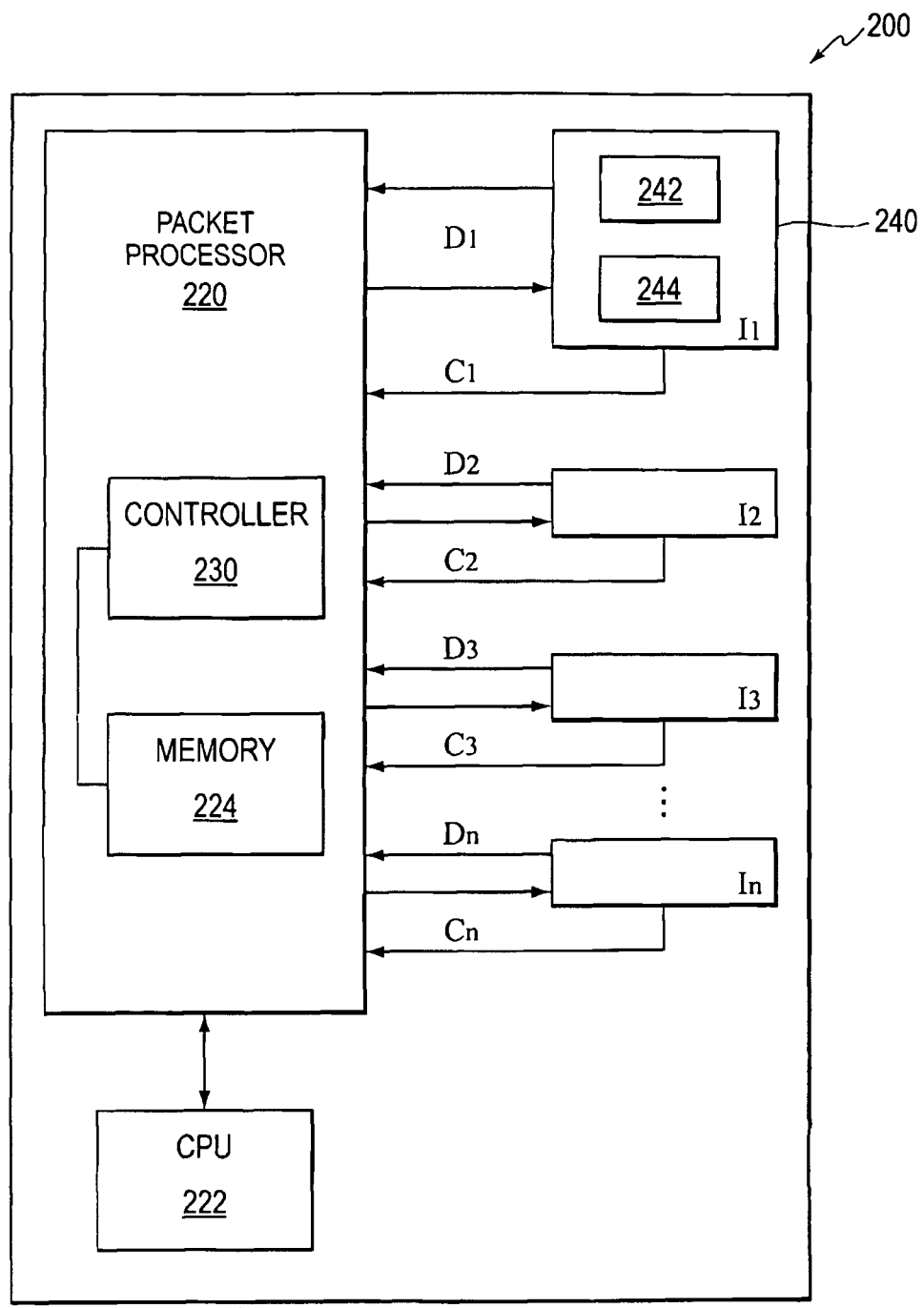
FIG. 2 shows an example of a packet switching device.

FIG. 2 shows an example of a packet switching device according to the disclosure. The packet switching device 200 can include a plurality of communication interfaces such as $I_1$-$I_n$, and a packet processor 220. These elements can be coupled as shown in FIG. 2. The plurality of communication interfaces $I_1$-$I_n$ can provide communication between outer links and the packet processor 220. The packet processor 220 can include packet processing resources, and can process received packets based on a resource allocation profile, such as memory allocation profile, and the like. In addition, the packet switching device 200 may include a CPU 222 coupled to the packet processor 220, for example via a PCI interface. The CPU 222 may execute various computations associated with the packet processor 220.

Each communication interface of $I_1$-$I_n$ can be configured based on communication requirements of an outer link and the packet processor 220. For example, the communication interface 240 can include an ingress port 242, as well as an egress port 244. The ingress port 242 can receive an incoming packet from an outer link, and can transmit the incoming packet to the packet processor 220. The egress port 244 can receive an outgoing packet from the packet processor 220, and can transmit the outgoing packet to the outer link. Therefore, the communication interface 240 can be configured to provide bilateral direction communications.

The packet processor 220 can include resources that can be utilized to handle a received packet. For example, the packet processor 220 can include a storage unit, such as memory unit 224, that can store descriptor and/or data of a packet.

In a conventional resource allocation technique, the resources can be allocated statically. For example, the memory unit 224 may include a plurality of memory blocks that can be allocated to a plurality of egress ports to buffer outgoing packets. The plurality of memory blocks can be evenly allocated to the plurality of egress ports. Therefore, each egress port can have a fixed number of memory blocks to buffer the outgoing packets. Among the egress ports, some egress ports may be non-active, such that the memory blocks allocated to those egress ports can be left unused. Other egress ports, however, may need to send a lot of packets, and may not have enough memory blocks to buffer those packets, thus resulting in that some packets may be dropped.

The above described scenario may get worse for a packet switching device utilizing a system-on-chip (SOC) technology. The SOC technology can integrate a CPU and a storage unit on a single chip to achieve faster memory accessing speed and smaller footprint. However, SOC design may entail fewer on chip memories, due to size/cost considerations. In addition, not all of the on chip memory cells may be available due to difficulties in chip manufacturing, for example. Consequently, evenly allocated memory cells may not be sufficient for a reasonable traffic network. Therefore, a more efficient memory allocation technique may be in need. According to the disclosure, a memory allocation profile, which controls the memory allocation, can be dynamically determined based on a condition, such as a network status, a port status, and the like.

According to the disclosure, the packet processor 220 may include a controller 230. The controller 230 can monitor a network status, such as link status, activity status, congestion status, and the like. For example, the controller 230 may monitor/receive indications, such as C1-Cn, from the communication interfaces. The indications may indicate, for example, a link status of the egress ports. In addition, the controller 230 may determine resource allocation profiles, such as memory allocation profile, and the like, based on the monitored network status. In an embodiment, the controller 230 can be coupled with the memory unit 224, and can allocate the memory unit 224 according to the resource allocation profiles.

In an embodiment, the controller 230 can be implemented as hardware, such as application specific integrated circuit (ASIC), and the like. However, software, or a combination of hardware and software may be used to implement the controller 230 instead.

Figures 3, 4:
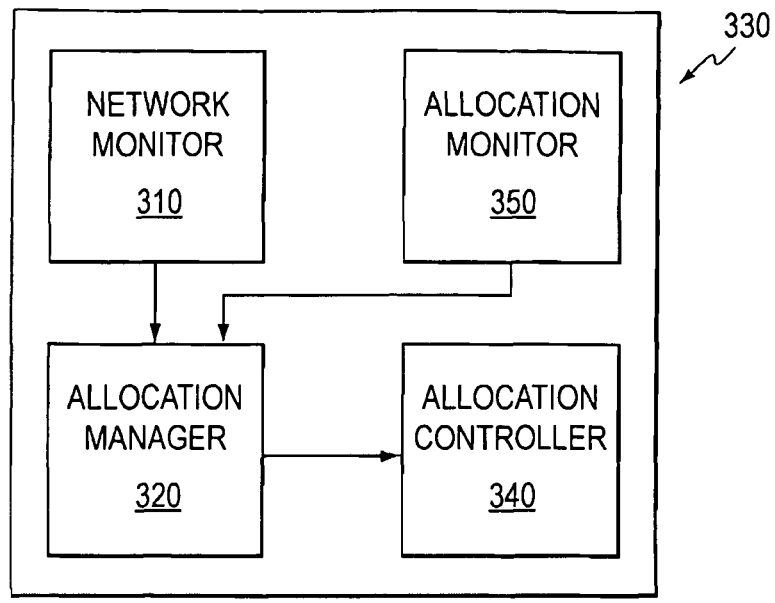
FIG. 3 shows an example of a controller in a packet switching device.
FIG. 4 shows an example of a resource allocation table.

FIG. 3 shows an example of a controller in a packet switching device. The controller 330 can include a network monitor 310, an allocation manager 320, and an allocation controller 340. In addition, the controller 330 may include an allocation monitor 350, which can be coupled to the memory unit 224, to measure a memory occupation. These elements can be coupled together as shown in FIG. 3.

The network monitor 310 can determine a network status, which may include link status, activity status, congestion status, and the like. For example, the network status may include a link status corresponding to a number of communication ports that are actively coupled to outer links. The network monitor 310 can be coupled to a plurality of communication ports, and monitor whether a communication port is actively coupled to an outer link. In an embodiment, the network monitor 310 can include a counter. The counter can count a number of egress ports that are actively coupled to outer links.

For another example, the network status may include an activity status corresponding to a flow of packets of a communication port. The network monitor 310 can be coupled to the plurality of communication ports, and can calculate activity identifiers, such as packets per second, bytes per second, and the like, for the plurality of communication ports. Further, the network monitor 310 can determine an activity status of a communication port based on the calculated activity identifier of the communication port. In an embodiment, the network monitor 310 may include a plurality of counters, each corresponding to an egress port. Each counter can count a data size that has been forwarded by the corresponding egress port during a specific time interval. Then, the network monitor 310 can determine an activity status for an egress port based on the corresponding counter.

In another example, the network status may include a congestion status corresponding to a state of packet traffic congestion of a communication port. Alternatively, the congestion status can be monitored by the allocation monitor 350. In an embodiment, the allocation monitor 350 may measure a memory occupation for an egress port, and determine a congestion status based on the memory occupation.

As known, a packet processor, such as the packet processor 220, may include a memory unit, such as the memory unit 224. The memory unit 224 may include a plurality of memory blocks, such as descriptor buffers and data buffers, which can be allocated to the plurality of communication ports to buffer packets. For example, before an egress port is able to transmit an outgoing packet, the egress port can temporarily store a descriptor of the outgoing packet in an allocated descriptor buffer, and store data of the outgoing packet in an allocated data buffer. When the egress port is in a state of congestion, outgoing packets pile up, and occupy a large amount of memory blocks allocated to the egress port. The allocation monitor 350 may measure a memory occupation, such as a number of descriptor buffers being occupied, for the egress port.

Further, the allocation monitor 350 can determine the congestion status of the egress port based on the memory occupation. In an embodiment, the allocation monitor 350 can include an occupation threshold. The allocation monitor 350 can determine the congestion status by comparing the memory occupation with the occupation threshold. For example, the allocation monitor 350 may determine that an egress port is in a "busy" congestion status if a number of occupied descriptor buffers is larger than the occupation threshold, and determine that the egress port is in a "calm" congestion status if the number of occupied descriptor buffers is smaller than the occupation threshold.

The allocation manager 320 can receive the network status from the network monitor 310/allocation monitor 350 and determine a resource allocation profile based on the network status. In accordance with an embodiment of the disclosure, the allocation manager 320 can determine the resource allocation profiled based on the congestion status corresponding to the memory occupation. Thus, the memory unit 224 can be efficiently utilized.

The resource allocation profile can be determined by various techniques, such as a predetermined algorithm, a pre-stored lookup table, and the like. In an embodiment, the allocation manager 320 can include a pre-stored lookup table. The pre-stored lookup table can store a resource allocation profile corresponding to a network status, for example.

The allocation controller 340 can receive a resource allocation profile from the allocation manager 320 and allocate resources accordingly. For example, the allocation controller 340 can include a plurality of registers that keep tracks of memory blocks allocated to a plurality of egress ports.

It should be noted that while the network monitor 310 monitors a condition of a network, and the allocation monitor 350 monitors a condition of a port as a function of an occupation status of a memory assigned to the port in the above example, alternative implementations may perform the above functions in separate blocks, or a combined block.

FIG. 4 shows an example of a resource allocation table. The resource allocation table 400 may include a network status field 410 and a resource allocation profile field 420. Each record (row) can store a resource allocation profile corresponding to a network status. The resource allocation table 400 can receive a network status, and provide a resource allocation profile corresponding to the network status. In an embodiment, the resource allocation profile can include a resource allocation limit corresponding to a communication port. The resource allocation limit can be determined based on the network status, and specific characteristics of the communication port, such as a type of the communication port.

Figure 5B:
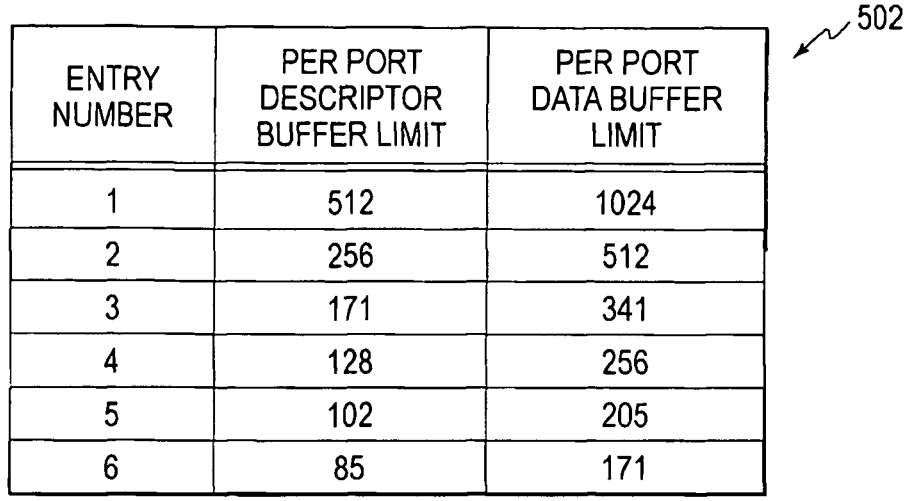

FIGS. 5A and 5B show detailed examples of memory allocation tables in accordance with an embodiment. The memory allocation table 501 can include an entry field 510, a descriptor buffer limit field 520, and a data buffer limit field 530. The entry field 510 can include a set of numbers corresponding to numbers of egress ports that are actively coupled to outer links (linked egress ports). The descriptor buffer limit field 520 can include a set of numbers corresponding to descriptor buffer limits that can be allocated to an egress port. A descriptor buffer can be a specific memory block that can store control information (descriptor) of a packet. The data buffer limit field 530 can include a set of numbers corresponding to data buffer limits that can be allocated to an egress port. A data buffer can be a specific memory block that can store data of a packet.

Each entry (row) of the memory allocation table 501 can store a descriptor buffer limit and a data buffer limit corresponding to a number of linked egress ports. The descriptor buffer limit and the data buffer limit can indicate a maximum number of descriptor buffers and a maximum number of data buffers that can be allocated to a linked egress port. In the example, it is assumed that the packet processor can include 2048 descriptor buffers and 4096 data buffers available to be allocated to the linked egress ports among a total of 24 egress ports. As can be seen, when 4 egress ports are actively coupled to outer links, as indicated by Entry 4, 512 descriptor buffers and 1024 data buffers can be allocated to each linked egress port. When 24 ports are actively coupled to outer links, as indicated by Entry 24, 85 descriptor buffers as well as 171 data buffers can be allocated to each linked egress port.

The resource allocation table 501 can be included in the allocation manager 320. When the allocation manager 320 receives a network status, such as a number of linked egress ports, an entry corresponding to the number of linked egress ports can provide a number of descriptor buffers and a number of data buffers that can be allocated to each linked egress port.

FIG. 5B shows another example of a memory allocation table. The memory allocation table 502 is similar to the memory allocation table 501, except including a smaller number of entries than the memory allocation table 501. An entry of memory allocation table 502 may correspond to a range of linked egress ports. For example, entry 1 may correspond to 1-4 linked egress ports; entry 2 may correspond to 5-8 linked egress ports; and so on so forth.

In another embodiment, the allocation manager 320 may include a predetermined algorithm to determine a resource allocation profile for a network status. For example, the allocation manager 320 may include an algorithm that can determine an even resource allocation profile. The algorithm may divide a total number of descriptor buffers or data buffers by a number of linked egress ports. Using the same assumptions as in table 501, when 4 egress ports are actively coupled to outer links, the algorithm may divide 2048 by 4 to determine a number of descriptor buffers, and may divide 4096 by 4 to determine a number of data buffers that can be allocated to each linked egress port.

FIGS. 6A-6G show an example of dynamic resource allocation based on a network status of a packet switching device.

The network status can include a congestion status of an egress port. The congestion status can be determined based on a memory occupation.

Figure 6A:
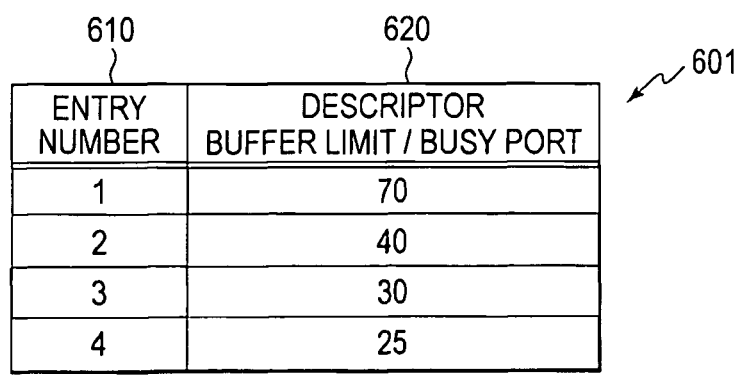
FIGS. 6A-6G show examples of dynamic memory allocation in a packet switching device.

FIG. 6A shows a memory allocation table that can be pre-stored in the allocation manager 320. The memory allocation table 601 can include an entry field 610, and a descriptor buffer limit field 620. The entry field 610 can include a set of numbers corresponding to numbers of "busy" egress ports. The descriptor buffer limit field 620 can include a set of numbers corresponding to limits of descriptor buffers that can be allocated to a "busy" egress port. Additionally, each "calm" port can be implicitly allocated a number of descriptor buffers, such as 10 in the example, according to a global configuration.

FIGS. 6B-6G can show memory allocations and memory occupations for 4 egress ports P1-P4 in different scenarios. More specifically, FIGS. 6B-6G can show a memory occupation for an egress port by a shaded bar, and can show a memory allocation for an egress port by a dashed bar.

Figure 6B:
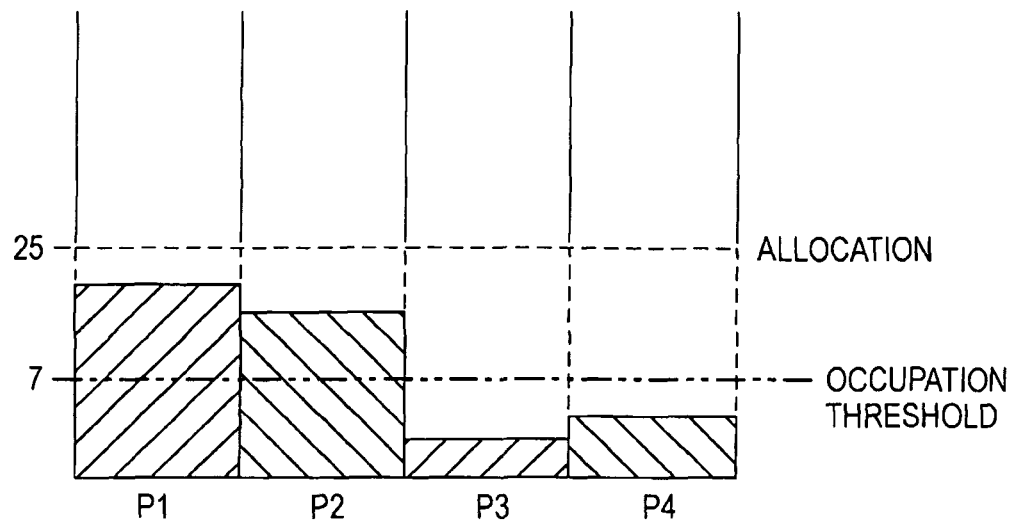

FIG. 6B shows an initial memory allocation profile that may evenly allocate 100 descriptor buffers to the 4 egress ports P1-P4. Each of the P1-P4 can have 25 descriptor buffers. As can be seen in FIG. 6B, egress ports P1 and P2 can have a larger memory occupation, while ports P3 and P4 can have a smaller memory occupation.

As described above, the allocation monitor 350 may include an occupation threshold, such as 7 shown in FIGS. 6B-6G. Therefore, the allocation monitor 350 can determine a congestion status for an egress port of P1-P4 by comparing a memory occupation of the egress port with the occupation threshold. As can be seen in FIG. 6B, the allocation monitor 350 can determine that egress ports P1 and P2 are "busy" ports, while egress ports P3 and P4 are "calm" ports. Further, the allocation monitor 350 may determine that the packet switching device is in a network status having two busy ports, and provide the network status to the allocation manager 320.

The allocation manager 320 may determine a memory allocation profile according to FIG. 6A. As can be seen in FIG. 6A, two busy ports can correspond to an allocation profile that each "busy" port can have 40 descriptor buffers. Thus, each "calm" port can have 10 descriptor buffers. The allocation manager 320 may transmit the memory allocation profile to the allocation controller 340 to allocate the 100 descriptor buffers accordingly.

Figure 6C:
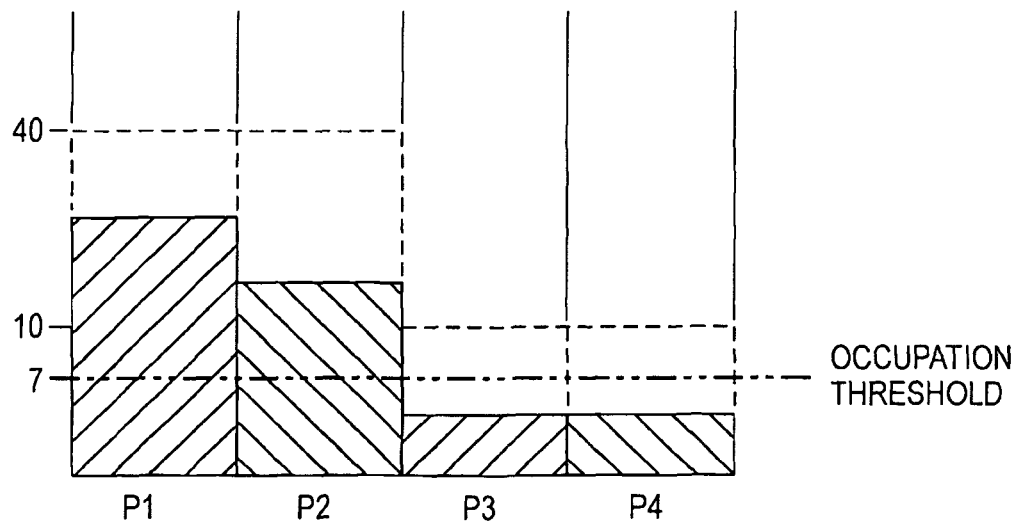

FIG. 6C shows the memory allocation for the egress ports P1-P4 afterwards. As can be seen, ports P1 and P2 can have 40 descriptor buffers allocated, while ports P3 and P4 can have 10 descriptor buffers allocated. Therefore, a large portion of memory can be allocated to "busy" ports.

Figure 6D:
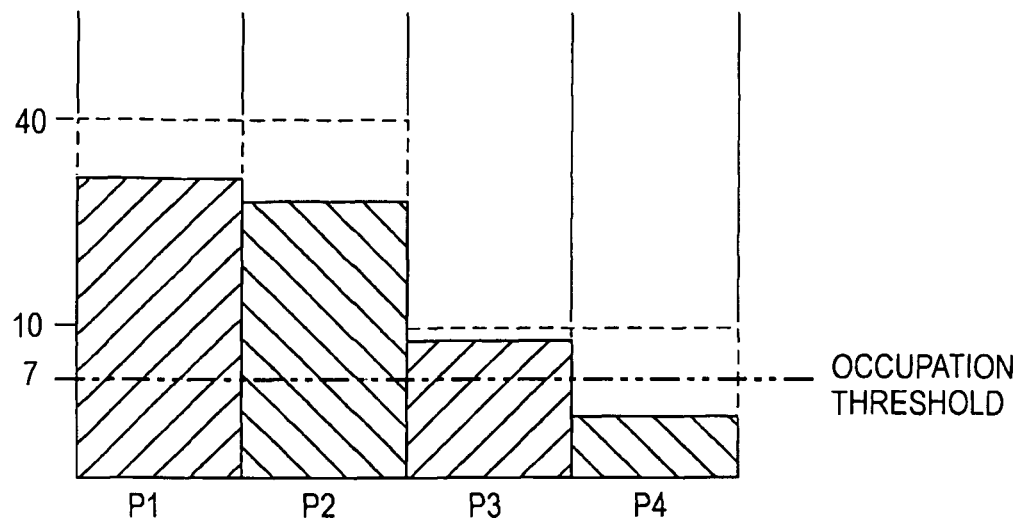

The network status can vary with time. For example, a host computer coupled to the egress port P3 may start a new application that may result in a large number of packets directed to the egress port P3 in a short time. Therefore, the large number of packets can pile up in memory blocks allocated to egress port P3. FIG. 6D shows an example of memory occupations for the above scenario. As can be seen, the egress port P3 can have a memory occupation that is larger than the occupation threshold. Therefore, the allocation monitor 350 can determine that the egress port P3 is in a "busy" congestion status. Accordingly, the allocation monitor 350 can determine that the packet switching device has a network status of 3 "busy" ports, and provide the network status to the allocation manager 320. Then, the allocation manager 320 can determine a memory allocation profile according to FIG. 6A.

As can be seen in FIG. 6A, 3 "busy" ports can correspond to a memory allocation profile that each "busy" port can have 30 descriptor buffers. Thus, each "calm" port can have 10 descriptor buffers. The allocation manager 320 may transmit the memory allocation profile to the allocation controller 340 to allocate the 100 descriptor buffers accordingly.

Figure 6E:
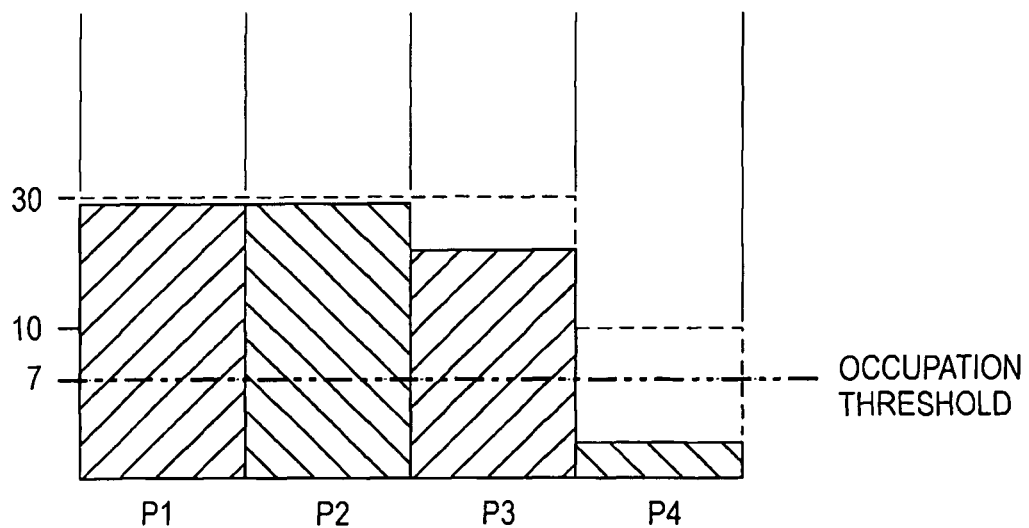

FIG. 6E shows the memory allocation for the egress ports P1-P4 afterwards. As can be seen, egress ports P1, P2 and P3 can have 30 descriptor buffers while egress port P4 can have 10 descriptor buffers. Thus, more descriptor buffers are allocated to the new "busy" egress port P3.

Figure 6F:
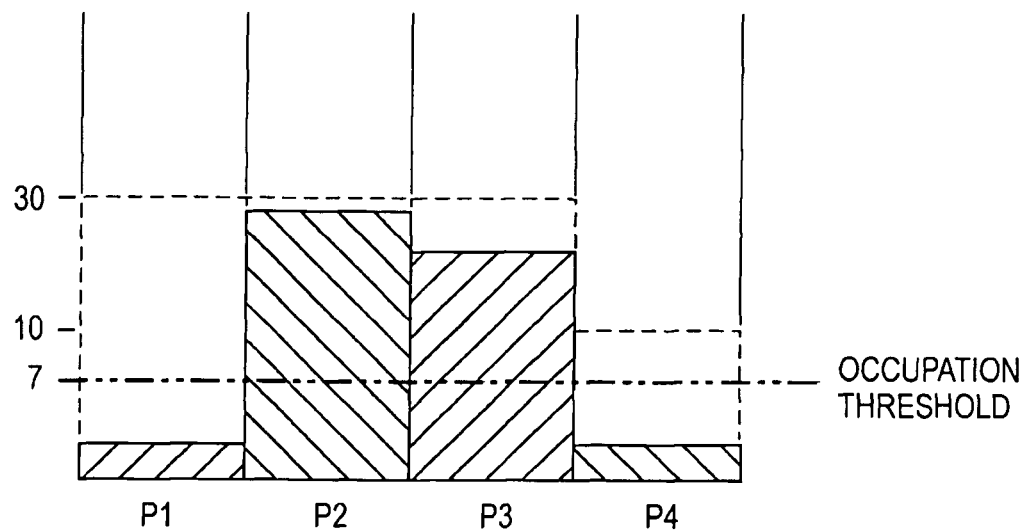

FIG. 6F shows memory occupation in another scenario. As can be seen, the egress port P1 can have a memory occupation that is smaller than the occupation threshold. This may result from a termination of a network application running on a host computer coupled to the egress port P1, for example. Therefore, the allocation monitor 350 can determine that the egress port P1 is in a "calm" congestion status. Accordingly, the allocation monitor 350 can determine that the packet switching device has a network status of 2 "busy" ports, and provide the network status to the allocation manager 320. Then, the allocation manager 320 can determine a memory allocation profile according to FIG. 6A.

As can be seen in FIG. 6A, two busy ports can correspond to a memory allocation profile that each "busy" port can have 40 descriptor buffers. Thus, each "calm" port can have 10 descriptor buffers. The allocation manager 320 may transmit the memory allocation profile to the allocation controller 340 to allocate the 100 descriptor buffers accordingly.

Figure 6G:
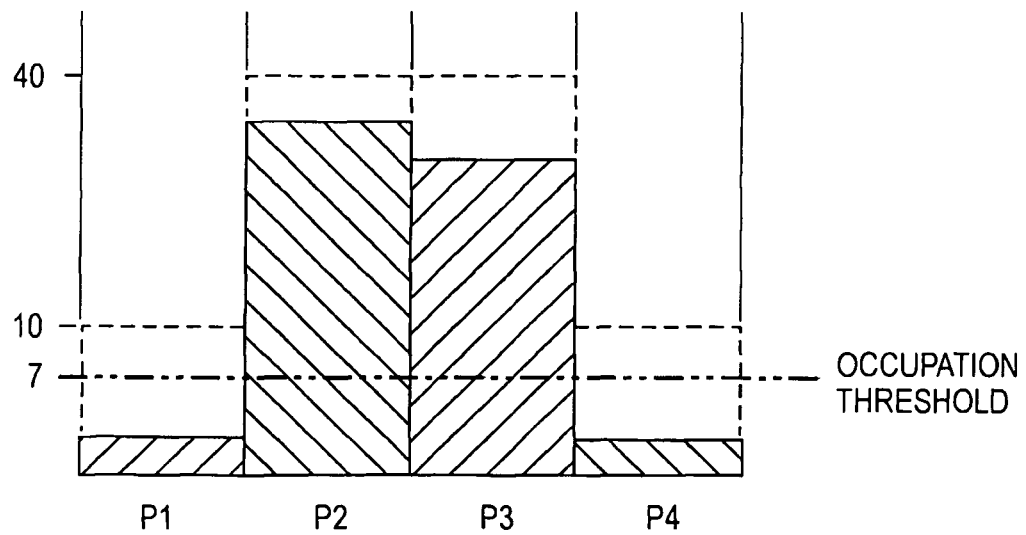

FIG. 6G shows the memory allocation for the egress ports P1-P4 afterwards. As can be seen, the egress ports P2 and P3 can have 40 descriptor buffers allocated while the egress port P1 and P4 can have 10 descriptor buffers allocated. Therefore, the memory allocation of the packet switching device can suit the network status of the packet switching device.

Figure 7:
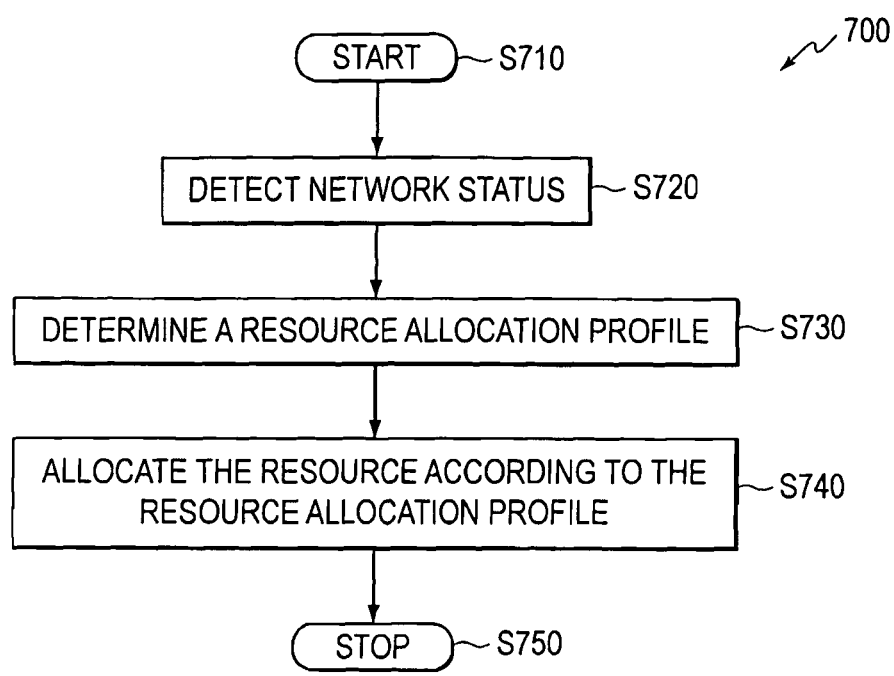
FIG. 7 shows an example of a flowchart outlining a resource allocation process in a packet switching device.

FIG. 7 shows an example of a flowchart outlining a process of resource allocation according to a network status. The network status can include a link status, an activity status, a congestion status of an egress port, and the like. In an embodiment, the congestion status of the egress port can be determined based on a memory occupation of the egress port.

The process starts at step S710, and proceeds to step S720. In step S720, the network monitor 310/the allocation monitor 350 can detect a network status, which can include a link status corresponding to a number of egress ports actively coupled to outer links, an activity status corresponding to a packet flow of an egress port, a congestion status corresponding to a state of packet traffic congestion of an egress port, and the like. In an embodiment, the allocation monitor 350 may determine a congestion status based on a memory occupation of an egress port.

The detection can be triggered by time or events. In an embodiment, the network monitor 310/the allocation monitor 350 can detect the network status according to a schedule, such as every second. In another embodiment, the network monitor 310/the allocation monitor 350 can detect the network status based on events, such as upon an outer link being plugged in, for example. The network status can be provided to the allocation manager 320. The process then proceeds to step S730.

In step S730, the allocation manager 320 may determine a resource allocation profile based on the network status. In an embodiment, the allocation manager can include a lookup table that can correspond a network status with a resource allocation profile. Therefore, the allocation manager 320 can determine the resource allocation profile according to the lookup table. In another embodiment, the allocation manager 320 may include a predetermined algorithm that can determine a resource allocation profile given a network status. The determined resource allocation profile can then be provided to the allocation controller 340. The process then proceeds to step S740.

In step S740, the allocation controller 340 can control the resource allocation according to the resource allocation profile. In an embodiment, the allocation controller 340 may include a plurality of registers that can track memory blocks allocated to a plurality of egress ports. The process then proceeds to step S750 and terminates.

It should be understood that while the disclosure uses "busy" and "calm" as two levels for the congestion status, the disclosure concept can be suitably expanded to more than two levels.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A packet switching device, comprising:
    at least one ingress port configured to receive incoming packets of data;
    a plurality of egress ports that are configurable to transmit outgoing packets of data, the egress ports being all of the egress ports available in the packet switching device;
    an allocation manager configured to determine a subset of the egress ports actively coupled to outer links;
    a dynamically configurable storage unit configured to include all memory blocks of the packet switching device that are allocatable to the subset of the egress ports, each of the egress ports having one of a plurality of congestion statuses, wherein the all memory blocks are allocated among the subset of the egress ports, and all memory blocks that are de-allocated from the subset of the egress ports are always dynamically re-allocated back to the subset of the egress ports based on the congestion statuses such that egress ports having a same congestion status are allocated with a same number of memory blocks;
    a controller configured to change a size of a memory block that is allocated to an egress port as a function of a condition of at least one egress port;
    a counter configured to keep a count of interfaces connected to the subset of the egress ports;
    a resource allocation table configured to periodically fetch an entry of the resource allocation table, which is accessed by a dynamic allocation pointer derived based on the count; and
    an allocation register configured to copy values of the entry into the allocation register, the allocation register further configured to control a number of the memory blocks allocated for each of the interfaces based on the copied values.

2. The packet switching device according to claim 1, wherein the condition of the at least one egress port includes a link status corresponding to a number of egress ports that are active.

3. The packet switching device according to claim 1, wherein the condition of the at least one egress port includes an activity status corresponding to a flow of packets transmitted by an egress port.

4. The packet switching device according to claim 1, wherein the condition of the at least one egress port includes a congestion status corresponding to a state of packet traffic congestion of an egress port.

5. The packet switching device according to claim 4, wherein the state of packet traffic congestion at the given egress port includes a state of utilization of memory blocks allocated to the given egress port.

6. The packet switching device according to claim 1, further comprising:
    a processor configured to direct an incoming packet of data from the at least one ingress port to one of the subset of the egress ports based on information associated with the incoming packet of data, wherein at least a portion of the information is stored in a memory block during processing of the incoming packet of data.

7. The packet switching device according to claim 1, wherein all of the memory blocks are initially allocated evenly among the subset of the egress ports.

8. A packet switching device coupled to a network, comprising:
    at least one ingress port that receives incoming packets from the network;
    a plurality of egress ports that are configurable to transmit outgoing packets to the network, the egress ports being all of the egress ports available in the packet switching device;
    an allocation manager configured to determine a subset of the egress ports actively coupled to the network;
    a dynamically configurable storage unit configured to include all memory blocks of the packet switching device that are allocatable to the subset of the egress ports, each of the egress ports having one of a plurality of network statuses, wherein the all memory blocks are allocated among the subset of the egress ports;
    a controller configured to dynamically re-allocate always all memory blocks that are de-allocated from the subset of the egress ports of the dynamically configurable storage unit back to the subset of the egress ports based on the network statuses such that egress ports having a same network status are allocated with a same number of memory blocks;
    a counter configured to keep a count of interfaces connected to the subset of the egress ports;
    a resource allocation table configured to periodically fetch an entry of the resource allocation table, which is accessed by a dynamic allocation pointer derived based on the count; and
    an allocation register configured to copy values of the entry into the allocation register, the allocation register further configured to control a number of the memory blocks allocated for each of the interfaces based on the copied values.

9. The packet switching device according to claim 8, wherein the resource allocation table includes a portion of the storage unit corresponding to the network status.

10. The packet switching device according to claim 8, wherein the controller further comprises an algorithm configured to determine a portion of the storage unit based on the network status.

11. The packet switching device according to claim 8, wherein the network status includes a link status corresponding to a number of egress ports that are actively coupled to the network at a given moment of time.

12. The packet switching device according to claim 8, wherein the network status includes an activity status corresponding to a flow of packets transmitted by an egress port.

13. The packet switching device according to claim 8, wherein the network status includes a congestion status corresponding to a state of packet traffic congestion of an egress port.

14. The packet switching device according to claim 13, wherein the state of packet traffic congestion of the given egress port includes a state of utilization of a portion of the storage unit allocated to the given egress port.

15. The packet switching device according to claim 8, wherein the storage unit further comprises descriptor buffers configured to store control information of the outgoing packets, and data buffers configured to store data of the outgoing packets.

16. A method for allocating all portions of a storage unit of a packet switching device, comprising:
    detecting a network status of each of a plurality of egress ports of the packet switching device to determine a subset of the egress ports actively coupled to outer links;
    allocating the all portions of the storage unit of the packet switching device to the subset of egress ports;
    receiving incoming packets from at least one ingress port;
    storing at least a portion of an outgoing packet corresponding to at least one incoming packet in a portion of the storage unit allocated to one of the subset of the egress ports;
    transmitting the outgoing packet;
    re-allocating dynamically always all portions of the storage unit that are de-allocated from the subset of the egress ports back to the subset of the egress ports based on the network statuses such that egress ports having a same network status are allocated with a same amount of the storage unit;
    keeping a count of interfaces connected to the subset of the egress ports;
    periodically fetching an entry of a resource allocation table by a dynamic allocation pointer derived based on the count:
    copying values of the entry into an allocation register; and
    controlling a number of memory blocks allocated for each of the interfaces based on the copied values.

17. The method according to claim 16, wherein allocating all portions of the storage unit to the subset of the egress ports, further comprises:
    determining all portions of the storage unit based on the resource allocation table that includes all portions of the storage unit corresponding to the network status.

18. The method according to claim 16, wherein re-allocating dynamically the portion of the storage unit to the subset of the egress ports, further comprises:
    determining the portion of the storage unit based on an algorithm that takes the network status as an input to the algorithm.

19. The method according to claim 16, wherein the network status includes a link status corresponding to a number of egress ports that are actively coupled to the network at a given moment of time.

20. The method according to claim 16, wherein the network status includes an activity status corresponding to a flow of packets transmitted by an egress port.

21. The method according to claim 16, wherein the network status includes a congestion status corresponding to a state of packet traffic congestion of an egress port.

22. The method according to claim 19, wherein the state of packet traffic congestion of the given egress port includes a state of utilization of the portion of the storage unit allocated to the given egress port.

23. The method according to claim 16, wherein the storage unit further comprises descriptor buffers configured to store control information of the outgoing packets, and data buffers configured to store data of the outgoing packets.

24. The method according to claim 16, wherein allocating all portions of the storage unit to the subset of the egress ports, further comprises:
    allocating initially all portions of the storage unit evenly among the subset of the egress ports.

25. A method for allocating a storage unit in a packet switching device, comprising:
    detecting a condition of each of a plurality of egress ports of the packet switching device;
    allocating all portions of the storage unit of the packet switching device to a subset of the egress ports based on the condition;
    receiving incoming packets from at least one ingress port;
    storing at least a portion of an outgoing packet corresponding to at least one incoming packet in a portion of the storage unit allocated to one of the subset of the egress ports;
    transmitting the outgoing packet;
    re-allocating dynamically always all portions of the storage unit that are de-allocated from the subset of the egress ports back to the subset of the egress ports based on the conditions such that egress ports having a same condition are allocated with a same amount of the storage unit;
    keeping a count of interfaces connected to the subset of the egress ports;
    periodically fetching an entry of a resource allocation table by a dynamic allocation pointer derived based on the count;
    copying values of the entry into an allocation register; and
    controlling a number of memory blocks allocated for each of the interfaces based on the copied values.

26. The method according to claim 25, wherein the condition of at least one of the egress ports includes a link status that is active.

27. The method according to claim 25, wherein the condition of at least one of the egress ports includes an activity status corresponding to a flow of packets transmitted by the at least one of the egress ports.

28. The method according to claim 25, wherein the condition of at least one of the egress ports includes a congestion status corresponding to a state of packet traffic congestion of the at least one of the egress ports.

29. The method according to claim 28, wherein the state of packet traffic congestion includes a state of utilization of memory blocks allocated to the at least one of the egress ports.

* * * * *